Figure 24:
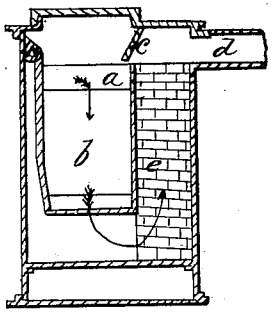
Figure 23:
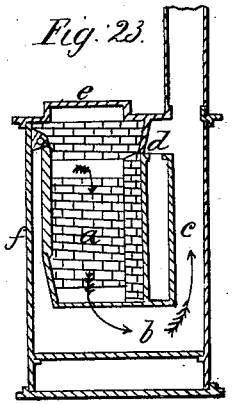
Figure 22:
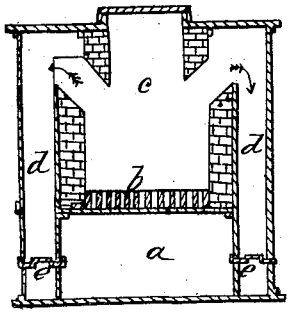
Figure 21:
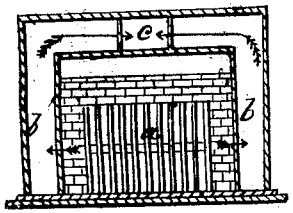

7258X
Sheet 1 - 5 Sheets.
E. Nott.
Magazine Stove.
Patented Oct. 25, 1832.
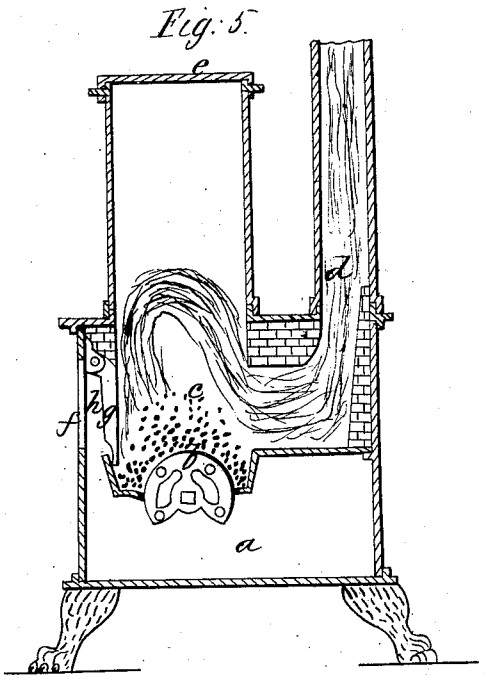
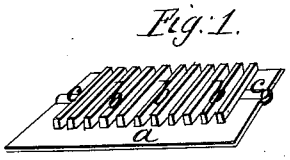
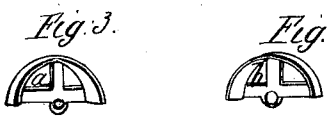
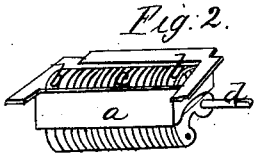

7258X
E. Nott.
Sheet 2 - 5 Sheets.
Magazine Stove.
Patented Oct. 25. 1839.
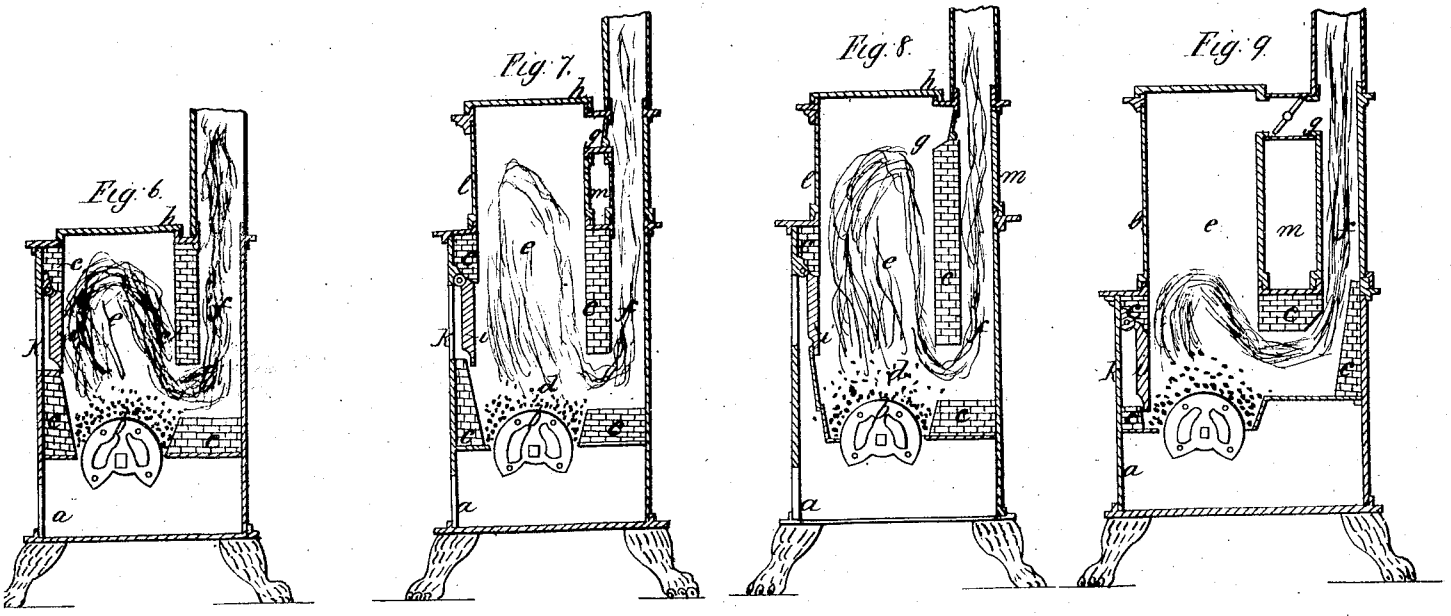

7258X
E. Nott.
Sheet 3-5 Sheets.
Magazine Stove.
Patented Oct. 25, 1832.
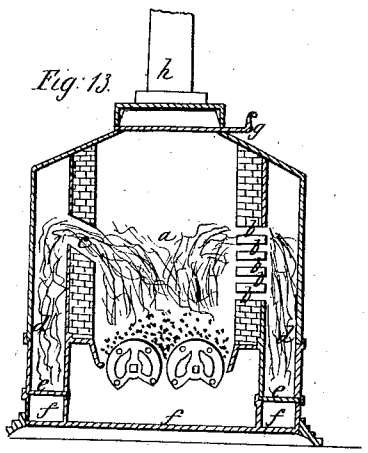
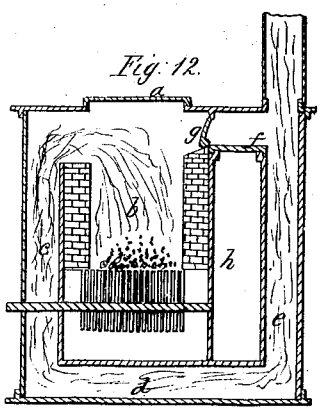
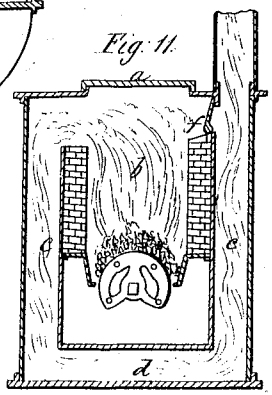
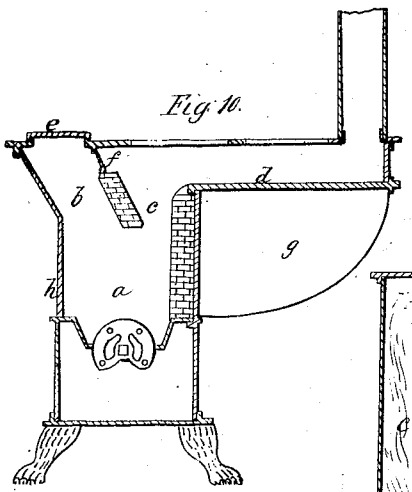

7258X
Sheet 4-5 Sheets.
E. Nott.
Magazine Stove.
Patented Oct. 25, 1832.
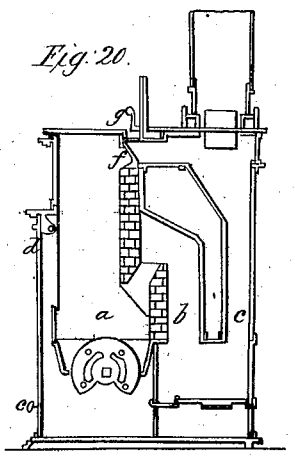
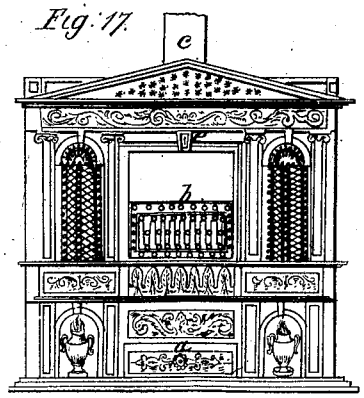
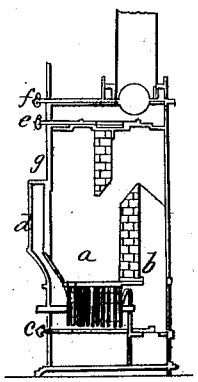
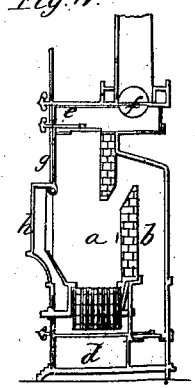
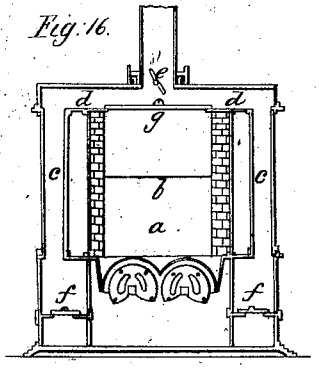
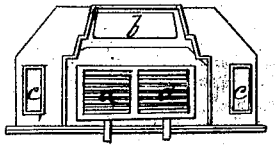
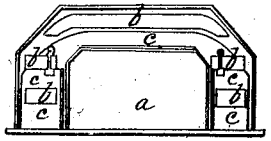

No Printed Specification Available

7258X

Sheet 5-5 Sheets.

E. Nott.

Magazine Stove. Patented Oct. 25, 1832.

United States Patent Office

PTO - BOYERS, PA Duty Station

MISSING PAGE TEMPORARY NOTICE

PATENT # 7258X FOR ISSUE DATE 10-25-1832

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text

Data Conversion Operation

Boyers, Pa